United States Patent [19]

Moser et al.

[11] 3,731,720
[45] May 8, 1973

[54] SHEAR ASSEMBLY FOR TREE HARVESTERS

[75] Inventors: Raymond L. Moser, Tremont; Edward J. Moyer, Morton, both of Ill.

[73] Assignee: Caterpillar Tractor Co., Peoria, Ill.

[22] Filed: July 27, 1970

[21] Appl. No.: 58,466

[52] U.S. Cl. ................................ 144/3 D, 144/34 E
[51] Int. Cl. ............................................. A01g 23/08
[58] Field of Search ................... 144/2 Z, 3 D, 34 R, 144/34 E, 309 AC, 246 R

[56] References Cited

UNITED STATES PATENTS

| | | | |
|---|---|---|---|
| 3,461,928 | 8/1969 | Siiro | 144/3 D |
| 3,468,352 | 9/1969 | Larson et al. | 144/34 E |
| 3,498,350 | 2/1970 | Maradyn | 144/309 AC |
| 3,528,468 | 9/1970 | Blonsky | 144/34 E |
| 3,542,099 | 11/1970 | Gibson | 144/3 D |
| 2,845,101 | 7/1958 | Hoadley | 144/34 E |
| 3,450,006 | 6/1969 | White | 144/3 D |
| 3,482,613 | 12/1969 | Jordan | 144/34 E |
| 3,576,202 | 4/1971 | Spanjar | 144/3 D |

FOREIGN PATENTS OR APPLICATIONS

| | | | |
|---|---|---|---|
| 1,313,995 | 11/1962 | France | 144/34 E |

*Primary Examiner*—Gerald A. Dost
*Attorney*—Fryer, Tjensvold, Feix, Phillips & Lempio

[57] ABSTRACT

A tree harvester including a mechanism for gripping and axially moving the tree, a shear assembly and a delimbing assembly, the shear assembly having an outwardly facing anvil secured to a frame, a rigid jaw and a pivotal blade extending outwardly from the frame on opposite sides of the anvil to form an outwardly facing opening for receiving a standing tree and a jack for pivoting the blade toward the jaw and anvil to sever the tree, the blade having a vertical plate arcuately secured to the blade in spaced apart relation from its pivotal connection with the frame, one end of the vertical plate adjacent a cutting edge of the blade also forming a vertical cutting edge.

9 Claims, 5 Drawing Figures

Patented May 8, 1973 3,731,720

INVENTORS
RAYMOND L. MOSER
EDWARD J. MOYER
BY
ATTORNEYS

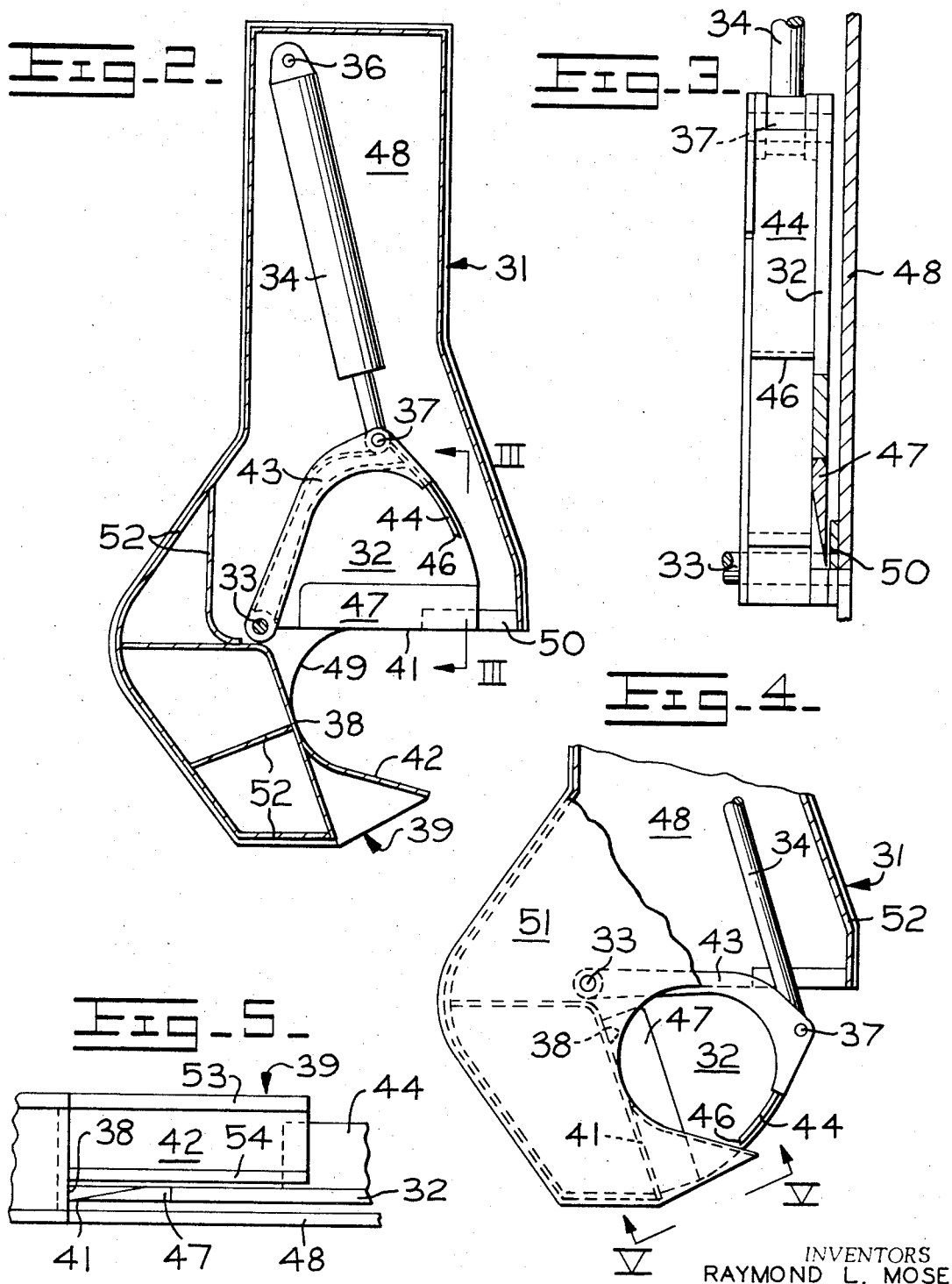

SHEAR ASSEMBLY FOR TREE HARVESTERS

Portions of the present tree harvester, the specific construction of which is not a particular part of the present invention, are described in greater detail in application Ser. No. 58,465, filed by Nathan Gutman et al. on July 27, 1970 and application Ser. No. 58,467 filed by Raymond L. Moser et al. on July 27, 1970, both of which are assigned to the assignee of the present invention.

The present invention relates to a shear assembly for mounting on a tree harvester to harvest or cut standing trees. The shear assembly may be employed alone in such an arrangement or in combination with other implements for further processing the tree after it is cut. As described below and shown in the accompanying drawings, the shear assembly is preferably combined with a delimbing assembly and a mechanism for gripping the tree and moving it through the delimber.

Various shear mechanisms which may be employed for tree harvesting have been described in the prior art. Some of these mechanisms include two swinging blades which are arranged on opposite sides of a standing tree and then urged toward each other for cutting the tree. Other shear mechanisms, which may be considered more similar to the present invention, include a single swinging blade.

In all arrangements of this type, the blade or blades must be forced to slice through trees of relatively substantial size. Accordingly, a most important function of such shear mechanisms is to rapidly and completely sever such standing trees. Other problems which such a shear assembly should desirably overcome include the ability to rapidly maneuver the shear assembly into place for example with respect to one of a group of closely spaced standing trees.

Further, it is generally desirable to sever the standing trees as close to the ground as possible. This is often made difficult by roots, growths or portions of the tree which project outwardly from its trunk. Also, the shear assembly must be designed to engage one of a closely spaced group of trees. Another desirable feature for such a shear assembly is the ability to rapidly replace the cutting edge of the blade due to its high rate of erosion caused by the shearing mode in which the blade operates.

Still another problem which should be desirably overcome is more clearly apparent when the shear assembly is employed together with other processing implements such as a delimbing assembly and a mechanism for gripping and axially moving the tree through the delimber for example. Within such an arrangement, it is usually desired to maintain the tree in place on the tree harvesting apparatus after it is cut by the shear assembly. This is sometimes difficult since the shearing action of the blade may tend to shift the tree while it is being cut.

Finally, due to the considerable stresses developed during shearing of the tree by the blade, the tree may tend to be shifted away from the shear assembly by its engagement with the blade before it is completely cut. This problem is most apparent when the blade or blades angle outwardly relative to a longitudinal axis of the vehicle while passing through the tree. With such an arrangement, the tree tends to shift forwardly away from the blade or the shear assembly and the vehicle upon which it is mounted may move out of proper engagement with the tree.

Accordingly, it is an object of the present invention to provide a shear assembly which minimizes or eliminates one or more of the above problem areas.

In particular, it is an object of the invention to provide a shear assembly having a single swinging blade which may come into generally parallel and abutting relation with an anvil surface to assure complete severing of the tree.

It is a further object to provide such a shear assembly having a jaw which together with the anvil and swinging blade form an outwardly facing opening for receiving the tree with the blade tending to move directly toward the jaw and/or the anvil during its entire shearing engagement with the tree.

It is also an object to provide a shear assembly wherein the blade also includes a small vertically arranged cutting edge for severing roots and other outwardly projecting portions of a standing tree for completely cutting through the tree particularly in close relation to the ground.

It is still another object to provide the shear assembly with a small vertical plate being arranged on the blade in spaced apart relation from its pivotal mounting to assist in retaining the tree in place within the shear assembly after it is cut.

Another object of the invention is to support the shear assembly upon a frame which may be pivoted along a horizontal axis to a vehicle for enabling the shear to cut standing trees as well as to cut a felled tree into appropriate lengths or sections during further processing.

Other objects and advantages of the present invention are made apparent in the following description having reference to the accompanying drawings.

In the drawings:

FIG. 2 is a plan view of the shear assembly with the shield or upper portion of the frame being removed to more clearly illustrate construction of the shear assembly;

FIG. 3 is a view taken along section line III—III of FIG. 2;

FIG. 4 is a fragmentary view similar to FIG. 2 with the blade being moved into parallel and abutting engagement with an anvil surface; and FIG. 5 is a view taken along section line V—V of FIG. 4.

Figure 1:
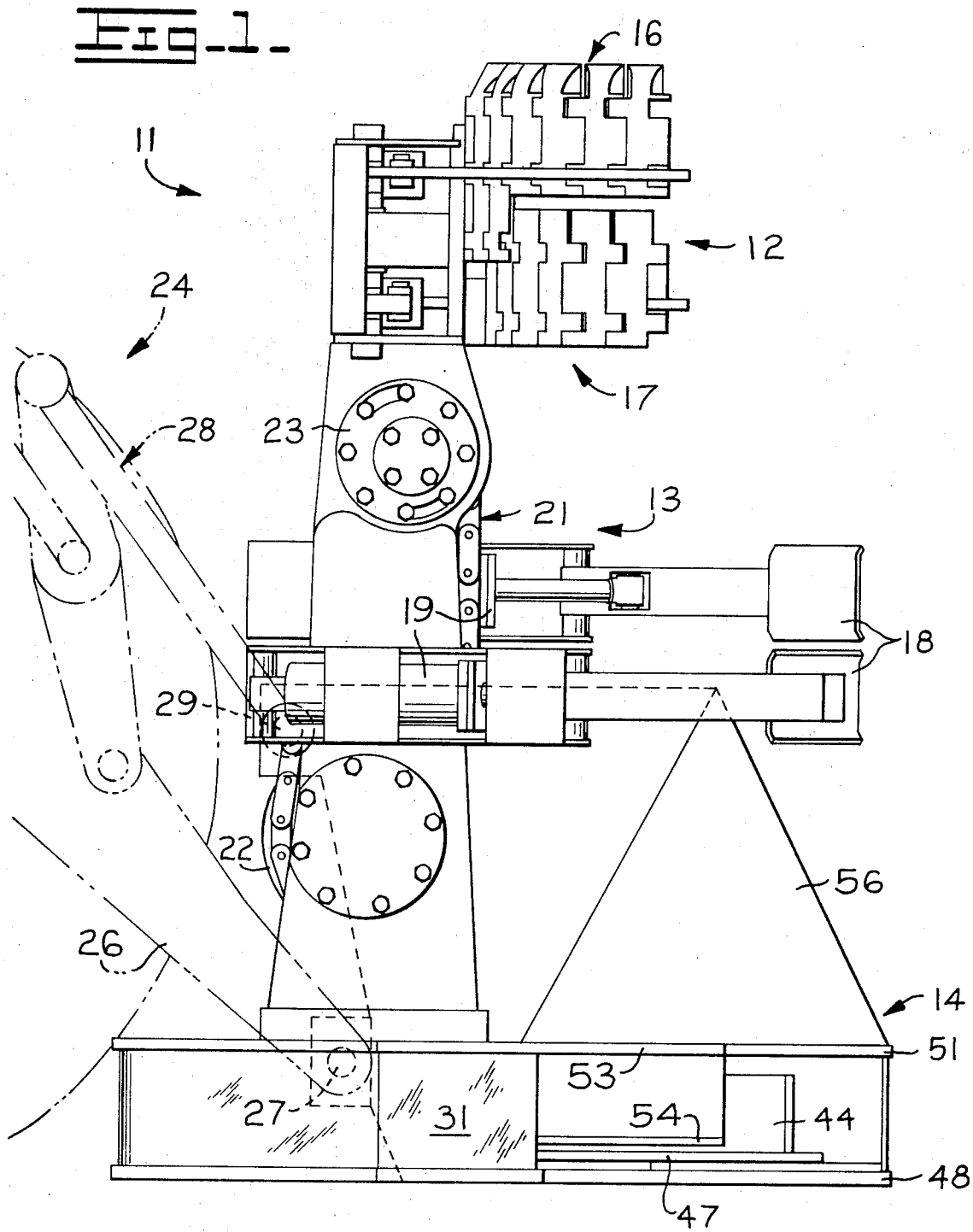
FIG. 1 is a side elevation view of a tree harvesting apparatus for mounting on a vehicle, the apparatus including a shear assembly constructed according to the present invention together with a delimbing assembly and a mechanism for gripping and axially shifting trees through the delimber.

Referring particularly to FIG. 1, a preferred embodiment of a tree harvester apparatus constructed according to the present invention is indicated at 11 including a delimbing assembly 12, a drive mechanism indicated at 13 for gripping trees to be processed and axially shifting them through the harvester and a shear assembly indicated at 14. The mechanism for gripping and shifting trees and the delimbing assembly are described in greater detail by the two references noted above.

For purposes of the present invention, it is sufficient to note that the delimbing assembly 12 preferably has a pair of flexible blades 16 and 17 which are sharpened along one edge and may be brought into cutting engagement about the circumference of a tree for moving limbs from the tree as it is shifted axially therethrough.

With regard to the drive mechanism 13, it includes a pair of gripping arms or grapples 18 which may be moved in opposition to each other by means of hydraulic motors 19 in order to firmly secure a tree against a drive means 21 in the form of an endless track or chain assembly arranged for rotation upon the harvester apparatus by means of rollers and sprockets, one of which is partially shown at 22.

Also in the preferred embodiment of the present invention, the delimbing assembly 12, the drive mechanism 13 and the shear assembly 14 are all supported upon a common frame structure 23 which may be mounted upon a vehicle such as that partially shown in phantom at 24. The vehicle is of the type having conventional lift arms, one of which is indicated at 26 with the frame 23 being secured to the lift arms 26 by means of horizontally arranged pivots such as that indicated at 27. A conventional tilt linkage 28 on the vehicle is also pivoted to the frame 23 at a location 29 above the pivot axis 27 with the tilt linkage being effective to pivot the frame 23 and the various portions of the tree harvester about the horizontal pivot 27.

In operation, the tree harvester apparatus is positioned by the vehicle to receive a standing tree within the shear assembly, the grapples and the delimbing assembly. The grapples 18 are moved by the motors 19 to secure the tree against the drive track 21 and the flexible blades of the delimbing assembly are also brought into engagement about the circumference of the tree.

The tree is severed by the shear assembly after which the top of the tree harvester is rotated forwardly and downwardly by the tilt linkage 28 so that the tree is generally in a horizontal position. The tree is then shifted axially through the delimbing assembly and toward the shear assembly by the drive track 21 with limbs being removed from the tree by the delimbing assembly. During this mode of operation, the shear assembly may be intermittently operated to also cut the delimbed tree into appropriate lengths or sections.

Construction features of the shear assembly 14 are also illustrated in FIGS. 2-5. Major components of the shear assembly include a rigid fabricated frame 31 which is secured to the erect frame 23 shown in FIG. 1, a blade 32 pivoted to the frame at 33, a hydraulic jack 34 pivoted to the frame at 36 and to the blade at 37, an anvil surface 38 and a jaw 39.

As best seen in FIG. 2, the anvil surface 38 is arranged upon the frame 31 to face outwardly or forwardly relative to a longitudinal axis through the vehicle illustrated in FIG. 1. The jaw 39 extends outwardly or forwardly from the frame generally at one end of the anvil surface. Preferably, the jaw is secured to a transverse end of the frame 31 to facilitate positioning of the tree harvester (also see FIG. 1) in engagement with one of two or more closely spaced trees. The pivot connection 33 between the blade and frame 31 is arranged at the other end of the anvil surface so that the blade may be placed in an open position by the jack 34, as shown in FIG. 2, to form an outwardly or forwardly facing opening together with the anvil surface 38 and the jaw 39 for receiving a tree. As illustrated in FIG. 4, the blade may be swung by extension of the jack 34 into parallel and abutting relation with the anvil surface 38 for cutting standing trees or for cutting the trees into selected lengths or sections during further processing.

Referring particularly to FIG. 2, it may be noted that when the blade is in a retracted position to form an opening for receiving a tree, its cutting edge 41 is generally parallel with an inside surface 42 of the jaw 39. Thus, as the blade is swung toward the position illustrated in FIG. 4, it tends to move directly toward the surface 42 of the jaw and/or the anvil surface 38 so that closing action of the blade does not tend to move the tree out of the opening formed between the blade, the jaw and the anvil surface.

Still referring particularly to FIG. 2, the blade is formed with the pivot points 33 and 37 and the outer end of its cutting edge 41 being generally arranged in triangular form. A fabricated flange 43 is secured to the blade to facilitate and provide rigidity within the pivot connections 33 and 37 for the blade. A small vertical plate 44 is also arcuately secured to an outer portion of the blade in spaced apart relation from its pivot point 33 to provide a rail in combination with a portion of the flange 43 for preventing a tree from slipping off the blade after the tree is cut by movement of the blade into its position illustrated in FIG. 4. The vertical plate 44 also provides a small vertically arranged cutting edge 46 generally adjacent the cutting edge 41 for the blade. The vertical cutting edge 46 serves to sever outwardly projecting portions of a standing tree, particularly roots when the tree is to be cut close to the ground.

The cutting edge 41 of the blade is formed by a replaceable element 47 which may be integrally secured to the blade, for example, by welding. Because of the high rate of wear experienced by the cutting edge of the blade, this construction permits replacement of the cutting edge while avoiding the necessity to replace the entire blade.

As may be best seen in FIG. 2, the frame 31 includes a lower plate member 48 which is arranged beneath the jack 34 and the blade in its retracted or open position to protect those elements from damage. The lower plate 48 of the frame is also formed with an arcuate edge 49 adjacent the anvil surface 38 to assist in properly positioning trees within the opening formed by the blade, the anvil surface and the jaw 39. A bearing member 50 arranged upon the frame 31 for supporting the blade during a substantial portion of its travel between the opened position illustrated in FIG. 2 and the closed or cutting position illustrated in FIG. 4. The frame 31 also includes an upper plate 51 which is at least partially illustrated in FIGS. 1 and 4 while being removed in FIG. 2 to better illustrate construction of the shear assembly. Various vertical cross pieces 52 are secured between the plates 48 and 51 to further protect various components of the shear assembly and more importantly to provide rigidity, particularly for the anvil surface 38.

As may be best seen in FIG. 5, the jaw 39 is also formed from two spaced apart plates 53 and 54 which are integrally secured to the frame 31, for example, by welding.

Referring particularly to FIG. 1, a shield 56 is secured to the upper plate 51 and extends upwardly and rearwardly above the shear assembly to protect various components of the harvester apparatus as well as to guide brush or other loose material away from the harvester apparatus particularly during forward movement of the vehicle.

What is claimed is:

1. A tree harvester apparatus for mounting on a vehicle by means of a horizontal pivot connection, comprising
   a frame,
   an assembly including means for gripping the tree and means for shifting it axially,
   a delimbing assembly for removing limbs from the tree as it is axially shifted, and
   a shear assembly including a jaw extending outwardly from the frame, a blade being pivoted to the frame in spaced apart relation with the jaw, and having a cutting edge, an anvil secured to the frame and forming the rear surface of an outwardly facing opening together with the jaw and the blade when the blade is pivoted to have its cutting edge extending outwardly from the frame, a motor means pivotally interconnected between the frame and blade to pivot the cutting edge of the blade into parallel and abutting relation with the anvil, the blade having a vertical plate arranged arcuately on an outer portion of the blade relative to its pivotal connection with the frame, one end of the vertical plate adjacent the cutting edge of the blade forming a smaller vertical cutting edge.

2. The tree harvester of claim 1 wherein the motor means is a jack pivotally connected with the frame and the blade in spaced apart relation from its pivotal connection with the frame, the cutting edge being formed by a replaceable portion of the blade.

3. A tree harvester assembly for mounting on a vehicle and including a shear assembly comprising:
   a frame for attachment to the vehicle in generally transverse relation to a longitudinal axis of the vehicle,
   a fixed jaw including an inside planar surface extending outwardly and forwardly from the frame,
   a blade with a cutting edge pivoted to the frame in spaced apart relation from the jaw for swinging motion between an open position with said blade extending forwardly from the frame to form an outwardly and forwardly facing opening between the jaw and cutting blade for receiving a tree and a closed portion with the blade pivoted toward the jaw to span the forwardly facing opening,
   a motor means connected between the frame and the blade for controlling its swinging motion, and
   a rigid anvil secured to the frame for forming a rear surface of the forwardly opening, the pivot point of the blade being positioned adjacent one end of the anvil and the anvil being arranged transversely so that the blade initially moves toward the jaw and then toward the anvil during cutting engagement with the tree to maintain the tree within the forwardly facing opening while it is being cut, the cutting member being swingable into abutting relation with the anvil to assure complete severing of the tree.

4. The tree harvester of claim 3 wherein the blade has a generally arcuate surface opposite its pivotal connection with the frame, a small vertical plate being secured to the blade along its arcuate surface to enclose a portion of the tree when the blade abuts the anvil and assist in maintaining the severed tree within the opening, the vertical plate having a vertical cutting edge at one end adjacent the cutting edge of the blade.

5. The tree harvester of claim 4 wherein the cutting edge is formed by a replaceable portion of the blade and the motor means is a hydraulic jack pivotally interconnected between the frame and the blade in spaced apart relation from its pivotal connection with the frame.

6. The tree harvester of claim 3 wherein the cutting edge is formed by a replaceable portion of the blade and the motor means is a jack pivotally interconnected between the frame and the blade in spaced apart relation from its pivotal connection with the frame, the jaw being mounted at one end of the frame.

7. The tree harvester of claim 3 wherein the frame includes a horizontal pivot means for connection with the vehicle to permit pivoting of the blade and jaw between a generally horizontal plane and a generally vertical plane.

8. The tree harvester of claim 7 wherein the frame extends perpendicularly from the jaw and blade for supporting means to grip and axially move the tree and a delimbing assembly, the gripping means being arranged to secure the tree against the means for axially moving the tree while the tree is in position within the forwardly extending opening of the blade assembly for severing, the delimbing assembly including means for presenting cutting means about the circumference of the tree for removing limbs while the tree is being axially moved.

9. The tree harvester of claim 8 wherein the motor means is a jack pivotally interconnected between the frame and the blade in spaced apart relation from its pivotal connection with the frame.

* * * * *